(12) United States Patent
Derby

(10) Patent No.: US 7,712,598 B1
(45) Date of Patent: May 11, 2010

(54) ROBOTIC TREAD SYSTEM HAVING A NET-ZERO MOTION HEAD FOR MOVING OBJECTS

(76) Inventor: Stephen J. Derby, 172 Lockrow Rd., Troy, NY (US) 12180

( * ) Notice: Subject to any disclaimer, the term of this patent is extended or adjusted under 35 U.S.C. 154(b) by 113 days.

(21) Appl. No.: 12/229,707

(22) Filed: Aug. 26, 2008

Related U.S. Application Data

(60) Provisional application No. 60/966,367, filed on Aug. 27, 2007.

(51) Int. Cl.
*B65G 15/00* (2006.01)
(52) U.S. Cl. .................. 198/343.1; 198/343.2
(58) Field of Classification Search ............. 198/343.1, 198/343.2, 465.1, 465.4, 474.1; 901/7
See application file for complete search history.

(56) References Cited

U.S. PATENT DOCUMENTS 4,880,102 A * 11/1989 Indrebo .................... 198/474.1
4,982,827 A * 1/1991 Seitz et al. ................ 198/349.8
5,503,264 A * 4/1996 Eberle ...................... 198/343.1
6,688,451 B2    2/2004 Derby et al.
6,764,069 B2 * 7/2004 Reist ........................ 198/343.2
7,584,837 B2 * 9/2009 Roether et al. ........... 198/343.1

* cited by examiner

*Primary Examiner*—James R Bidwell
(74) *Attorney, Agent, or Firm*—Malcolm J. Chisholm, Jr.

(57) ABSTRACT

The system (50) includes at least one tread (52) secured to a tread drive means (54) for moving the tread (52) in a direction of a tread work-axis of motion (58) adjacent an object (78) to be moved. A head (57) is secured to the tread (52), and the head (57) includes a device (66) for grabbing the object (78). The head (57) selectively moves in at least a direction opposed to the tread work-axis of motion (58) and at a rate of speed at least the same as the rate of speed the drive means (54) moves the tread (52) in the tread work-axis of motion (58) direction to thereby achieve a net-zero motion relative to the object (58) to facilitate picking and placing the object (58). A plurality of treads (52) with such heads (57) may be secured in an endless loop (56).

13 Claims, 8 Drawing Sheets

ROBOTIC TREAD SYSTEM HAVING A NET-ZERO MOTION HEAD FOR MOVING OBJECTS

CROSS REFERENCE TO RELATED APPLICATION

This Application claims the benefit of U.S. Provisional Patent Application Ser. No. 60/966,367, entitled "Robotic Tread System Having a Net-Zero Motion Head for Moving Objects" that was filed on Aug. 27, 2007.

TECHNICAL FIELD

The present invention relates to robots utilized primarily in manufacturing, and particularly relates to a robotic tread system that eliminates repeated stopping and starting of most of the mass of the system while a head of the system achieves a net-zero motion relative to an object to facilitate acquisition and placement of the object by the head.

BACKGROUND ART

Robotic systems are well known in manufacturing of many different objects, such as food products, automobile components, precision electronic assembly, etc. One traditional robotic system is commonly referred to as a "SCARA" (Selective Compliance Articulated Robot Arm), such as is shown in a simplified schematic representation in FIG. 1 and represented by the reference numeral 10. The SCARA system involves an arm moving from a first stop at a ready position to a second stop at a pick position (shown in FIG. 1) to acquire a work object 14, such as from a stack 16 of work objects. The arm 12 then moves to a third stop at a place position (not shown), such as on a manufacturing or packaging conveyor, to place the work object on the conveyor, and then the arm 12 moves back to the first stop or ready position, or to the second stop or pick position, depending upon a particular job. For the SCARA robotic system 10 to perform a standard pick-and-place operation, a gripper 18 secured to the arm 12 acquires the object 14 through standard grabbing apparatus, which may be mechanical, pneumatic, etc. As is apparent, the primary motion axes of the gripper 18 are all vertical and the arm 12 and its sub-members lie in a plane parallel to a floor (not shown) supporting the stack 16 and SCARA robot 10.

While such a SCARA robotic system 10 performs adequately with precision and frequently at very high cycle speeds, the requirement of many stops and starts is very energy inefficient. It is known that some SCARA robotic systems utilize so much energy that they experience up to a "13 G" force, or thirteen times the force of gravity for short durations to provide efficient cycle times. As the SCARA system 10 acquires, moves and places an object, the arm must execute repeated work and return motions. This pick-and-place cycle time is therefore only fifty percent efficient, and requires a lot of energy to move from a stop position through a work or return motion and back to another stop position.

In an effort to remove much of the inefficiency of the SCARA and other types of robotic systems, the present inventor and a co-inventor invented a "Multi-Head Robot System and Method Of Use" disclosed in U.S. Pat. No. 6,688,451 that issued on Feb. 10, 2004 to Derby et al, which Patent is hereby incorporated herein by reference. As shown in FIG. 2 in a simplified schematic of the Derby et al. multi-head robot system 20, an endless loop track 22 supports multiple robotic material handling devices 24 or heads. By having the robotic devices 24 secured to the track 22, the multi-head robotic system eliminates the return stroke of the SCARA robotic system 10. However, as the multiple heads 24 move over work objects so that each head 24 may pick an object, the heads must come to a stop at a pick position 26, and then move along the track to another stop at a place position 28. The multi-head system can achieve enhanced efficiency by having the multiple heads work in waves, such as a grouping of four or more heads (not shown), so that one stop acquires four work objects. Consequently, even though the return stroke of the SCARA system 10 is eliminated, the Derby et al. multi-head system nonetheless requires intermittent stops, which are energy inefficient. Additionally, the multi-head Derby et al. system requires care and precision in spacing of stopping points of the individual heads 24 and errors can produce collisions leading to substantial delays.

Accordingly, what is needed in the art is an improved robotic system that eliminates inefficient start-stop motions of large components of the system, and that also provides a variety of work axes of motion relative to movement of a work object from a first position to a second position.

SUMMARY OF THE INVENTION

The disclosure is directed toward a robotic tread system for moving objects. The system includes at least one tread secured to a tread drive means for moving the tread in a direction parallel to and in the same direction as a tread work-axis of motion relative to an object. A head is adjustably secured to the tread, and the head includes at least one material handling device capable of grabbing and manipulating the object. The head is adjustably secured to the tread by head securing means for selectively moving the head in at least a direction opposed to the tread work-axis of motion and for selectively moving the head at a rate of speed at least the same as a rate of speed the drive means moves the tread parallel to and in the same direction as the tread work-axis of motion. Therefore, as the tread moves in the direction parallel to the work-axis of motion relative to the object, the head moves along the tread in an opposed direction resulting in the head having a net-zero motion relative to the object with respect to the work-axis of motion. Consequently, while the tread continues to move at an uninterrupted, constant speed, the head travels along the tread in an opposed direction at a net-zero speed relative to the work object while picking the work object from a first object work-position. The head then moves with the tread to place the work object in a second object work-position.

The head securing means that secures the head to the tread not only moves the head in a direction opposed to the tread work-axis, but may also move the head in the opposed direction, parallel to and in the same direction as the tread work-axis while the head has grabbed the work object. This facilitates movement of the head along the tread to return the head from a head-grab position back to a head-start position. Whenever the tread is moved by the tread drive means from the first object work-position (e.g., the "pick" position) to the second object work-position (e.g., the "place" position), the head securing means will have moved the head back to the head-start position on the tread. Then, in placing the object at the second object work-position by disconnecting the object from the head, the head securing means again moves the head in a direction opposed to the tread work-axis to again achieve a net-zero motion relative to the placed object. This facilitates movement of the work object from the first object work-position to the second object work-position without the tread drive means having to stop.

In a preferred embodiment, a plurality of treads are secured to a loop means, such as a chain drive including one or more chains, to form a tread loop for driving the treads in an endless loop. In such an embodiment, each tread or a plurality of the treads would have at least one head secured to the tread as described above by a head securing means. The tread loop would be positioned so that the heads of the treads could sequentially pick up work objects in the first object work-position while the heads are at the described net-zero motion status relative to the work object. As the treads are moved along the tread work-axis by the tread loop to the second object work-position, the head securing means moves the head in the direction of the tread work-axis from the head-grab position back to the head-start position. Then, when the tread loop has moved the treads adjacent the second object work-position, the head securing means again moves the head in a direction opposed to the tread work-axis to achieve a net-zero motion relative to the second object work-position as the head disconnects from the object to place it at the second object work-position. Then, the head securing means may move the head back to the head-start position as the tread loop moves the tread in a loop to repeat the cycle movement of the treads to move the work objects. By the tread drive means being an endless tread loop, the vast majority of the mass of the robotic tread system moves along at a constant speed achieving substantial energy efficiency. The only components of the system that cycle between start and stop positions are the heads secured to the treads.

In another preferred embodiment the tread loop may be configured so that the heads move differing work objects adjacent opposed sides of the tread loop. Such an embodiment would be appropriate where for example a stack of work objects, or large trays of processed foods (e.g., cookies) are positioned centrally adjacent the tread loop, and two packaging conveyor lines are positioned adjacent opposed sides of the stack of work objects. One-half of the tread loop could then deliver work objects from the tray or stack to one of the packaging conveyor lines while the opposed half of the tread loop delivers work objects from the stack to the other of the conveyor lines. Varying embodiments also include variations wherein each tread may have one or more heads, and each head may have one or more material handling devices or object grippers.

In an additional embodiment, the robotic tread system includes a vision system means for identifying a location of a work object and a head of a tread integrated with a controller means for controlling motion of the head, or heads, relative to the position of the work object identified by the vision system, and for controlling acquisition and placement operation of the heads. The vision system means may include vision components secured to a tread, or to each tread, or to a central location providing visual access to the work objects moved by the system.

In an alternative preferred embodiment, the head securing means may be configured to selectively move the head in a direction perpendicular to the tread work-axis while optionally simultaneously moving the head in a direction or directions parallel to the work-axis. This facilitates use of the system with a broader range of work objects, as well as minimizes alignment requirements for the work objects relative to the head or heads on treads secured to the tread loop.

The disclosure is also directed toward a method of moving objects by utilizing the robotic tread system having a net-zero motion head secured to at least one tread. The method also includes using a plurality of treads, wherein one or more of the treads have a net-zero motion head secured to the tread, and wherein the plurality of treads are secured to a loop means forming a tread loop to move the objects.

DESCRIPTION OF THE PREFERRED EMBODIMENTS

Persons of ordinary skill in the art will realize that the following disclosure is illustrative only and not in any way limiting. Other embodiments of the disclosure will readily suggest themselves to such skilled persons having the benefit of this disclosure.

Figure 1:
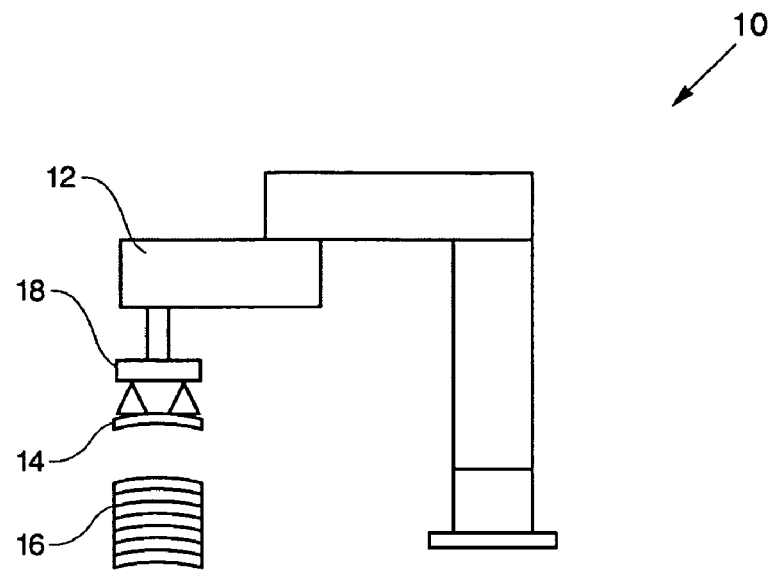
FIG. 1 is simplified side plan view of a prior art SCARA (Selective Compliance Articulated Robot Arm) robotic system for moving an object.
Figure 2:
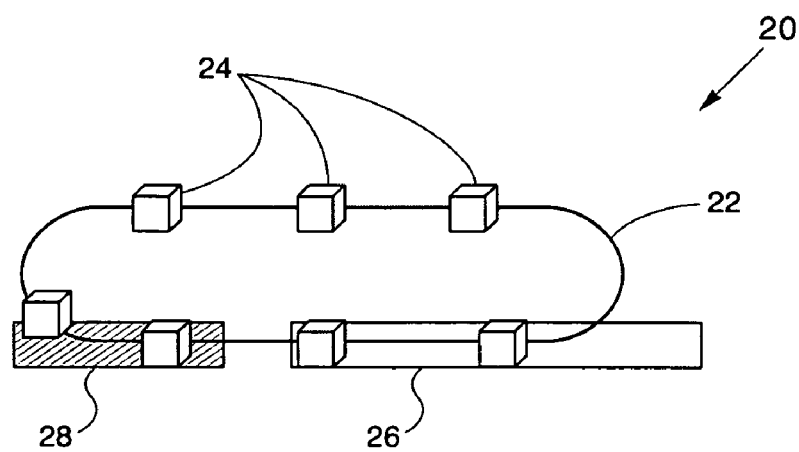
FIG. 2 is a simplified schematic view of a prior art multi-head robot system.
Figure 3A:
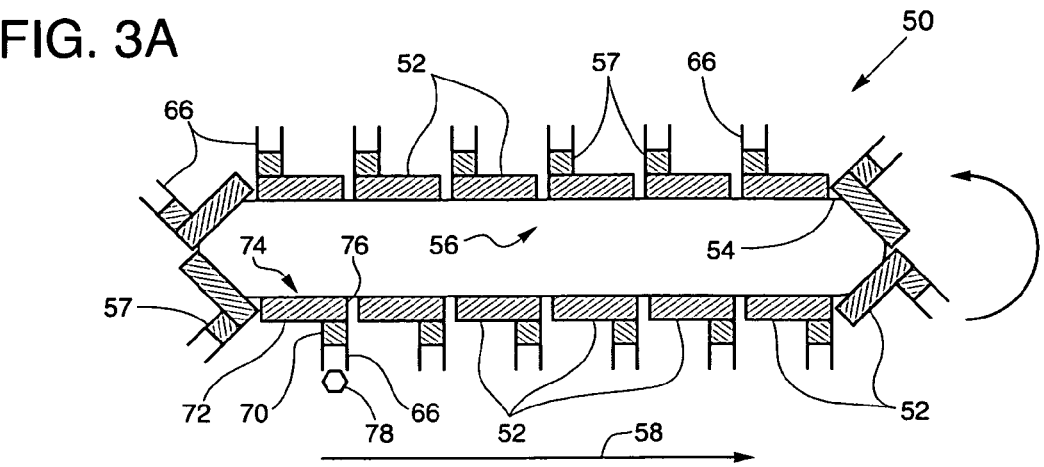
FIGS. 3A, 3B, 3C, 3D, 3E, 3F, 3G, 3H, 3I, and 3J are a sequence of simplified schematic views of a robotic tread system for moving objects constructed in accordance with the present invention, showing a net-zero motion head picking and placing an object and also showing the head moving from a head-start position in FIG. 3A, to a head-grab position in FIG. 3B, and moving back to the head start position in FIGS. 3E, 3F, and 3J, as described in more detail below.
Figure 12:
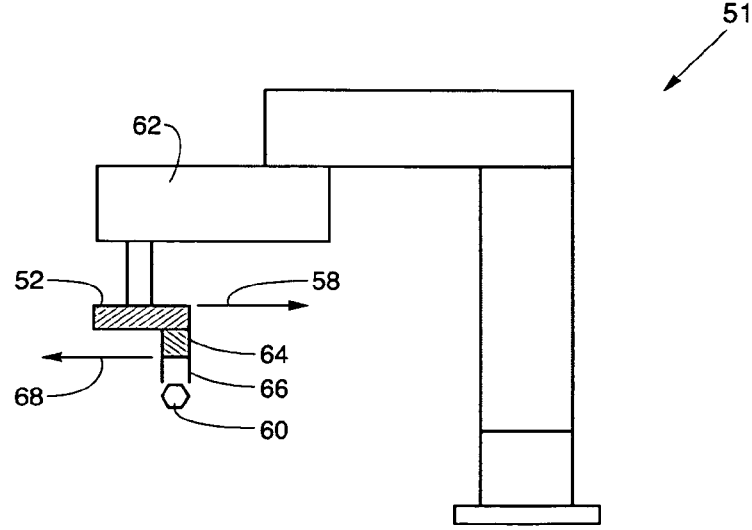
FIG. 12 is a simplified schematic view of a robotic tread system of the present invention showing a single tread having a net-zero motion head secured to the tread, and showing the tread secured to a SCARA (Selective Compliance Articulated Robot Arm) robotic system.

Referring to FIG. 3A a robotic tread system of the present invention is shown and is generally designated by the reference numeral 50. In the embodiment of the robotic tread system shown in FIG. 3A, the system 50 includes a plurality of treads 52 secured to a loop support and drive means 54 for securing the treads 52 together, such as parallel chains, a belt, etc., to form a tread loop 56 and for driving the treads and chains in an endless loop, such as by an electrical motor(s) (not shown), etc. secured to the loop means 54. Each tread includes at least one head 57. However, it is to be understood that the robotic tread system 50 also includes alternative embodiments, such as shown in FIG. 12 wherein a single-tread embodiment 51 of the system simply includes a single tread 52 secured to a tread drive means for moving the tread in a direction or directions parallel to a tread work-axis of motion relative to an object 60 that is to be moved. Similarly, the robotic tread system 50 may include embodiments wherein a plurality of the treads 52 include a head 57.

In FIGS. 3A-3J, 4, 5 and 12 the tread work-axis is designated by the arrow identified by reference number 58. The tread drive means may be any machine or apparatus capable of moving the tread 52 in a direction parallel to the tread work-axis 58, such as a standard SCARA (Selective Compliance Articulated Robot Arm) 62. The robotic tread system 51 shown in FIG. 12 having a single tread 52 also includes a head 64 adjustably secured to the tread 52, and the head includes at least one material handling device 66 capable of grabbing and securing the object 60 to be moved. The head 64 is adjustably secured to the tread 52 by a head securing means for selectively moving the head 64 in at least a head direction of motion (as shown by the arrow in FIG. 12) opposed to the tread work-axis 58 of motion. The head securing means is also configured for selectively moving the head 64 at a rate of speed at least the same as the rate of speed the drive means 62 moves the tread 52 parallel to and in the direction of the tread work-axis of motion 58. Therefore, as the tread 52 moves in the direction of the work-axis of motion 58 relative to the object 60, the head 64 moves along the tread 52 in the opposed head direction of travel 68 resulting in the head 64 having a net-zero motion relative to the object 60. This facilitates the material handling device 66 of the head 64 grabbing the object 60 while the tread 52 continues to move at a constant speed to move the grabbed object from a first object work-position to a second object work-position, such as in a traditional pick-and-place motion, and as described below with respect to FIGS. 3A-3J. The head securing means may be any apparatus or machinery known in the art capable of performing the described function, and an exemplary head securing means is described below with respect to FIG. 8A. The material handling device 66 may also be any apparatus known in the art that performs the described functions, such as mechanical closure and opening apparatus, pneumatic apparatus, electro-magnetic apparatus, etc.

Figure 3B:
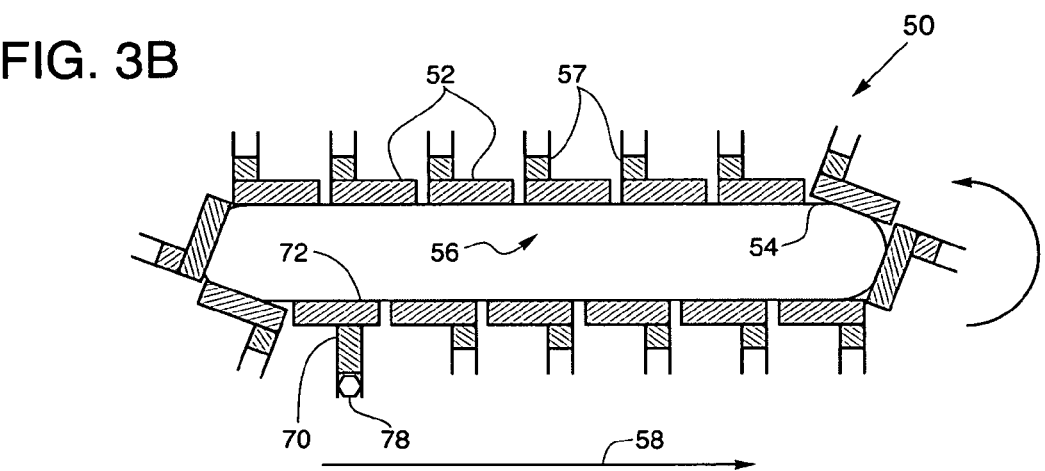

Referring again to FIG. 3A and then to FIGS. 3B-3J, an exemplary working head 70 secured to an exemplary working tread 72 of a tread loop 56 embodiment of the present robotic tread system 50 is shown sequencing by the system 50 through a traditional pick-and-place operation along the tread work-axis 58. In FIG. 3A, the exemplary working tread is shown in a first object work-position 74 of the tread loop 56, and the exemplary working head 70 is shown in a head-start position 76 on the tread 72. Whenever the tread 72 is adjacent a work object 78, as shown in FIG. 3A, a controller means 80 (shown in FIG. 7) for controlling the head 72 to perform as described herein, controls the head 70 to commence moving in a direction opposed to the tread work-axis 58 direction of motion of the tread 72 along the tread loop 56 to thereby achieve a net-zero motion relative to the object 78 to be grabbed. Then or simultaneously the controller controls the head to activate its material handling device 66 to commence grabbing the object 78, as shown in FIG. 3B.

Figure 3C:
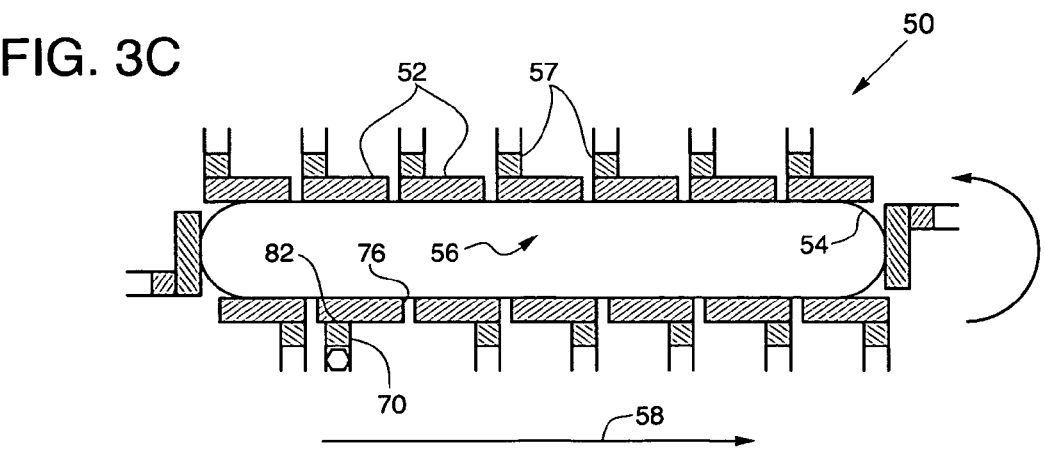
Figure 3D:
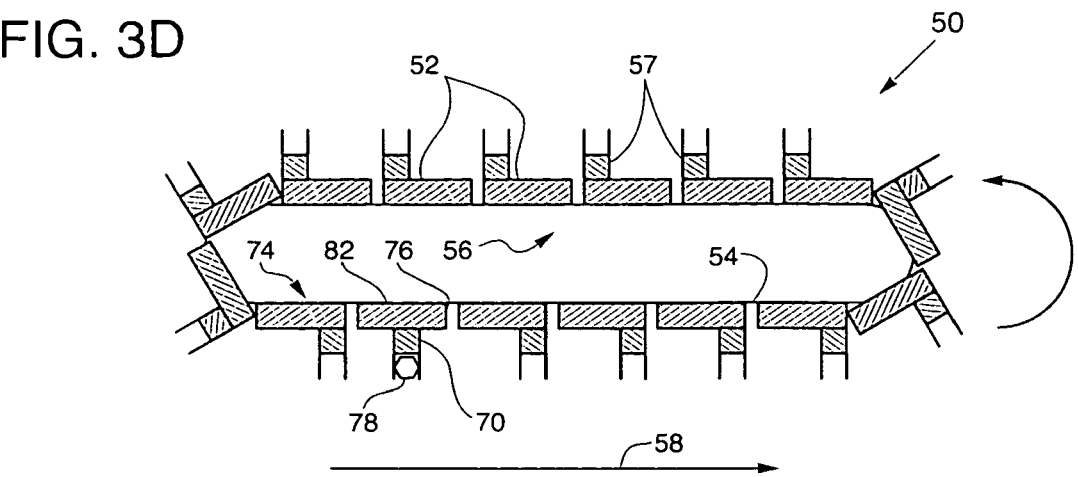
Figure 3E:
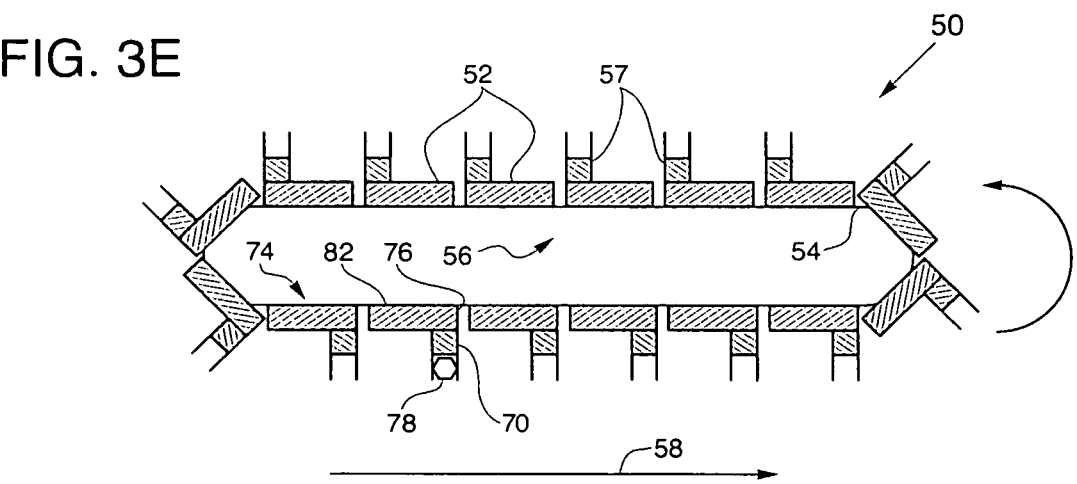

FIG. 3C shows that the material handling device 66 has moved the object 78 closer to the tread 72, such as off of a food preparation tray (not shown), etc. FIG. 3C also shows that the head securing means has moved the head further along the tread 72 in a direction opposed to the tread work-axis 58 direction of travel of the tread 72 shown in FIGS. 3A-3C, so that the head may be characterized as having reached a head-grab position 82, wherein the head 70 has completed acquisition of the object 78. Next, as the tread 72 continues an uninterrupted transit along the tread loop 56, the head securing means moves the head 70 back from the head-grab position 82 back to the head-start position 76, which is shown schematically in FIGS. 3D-3E, wherein the head 70 is positioned by the head securing means back at the head-start position 76, as shown in FIG. 3E.

Figure 3F:
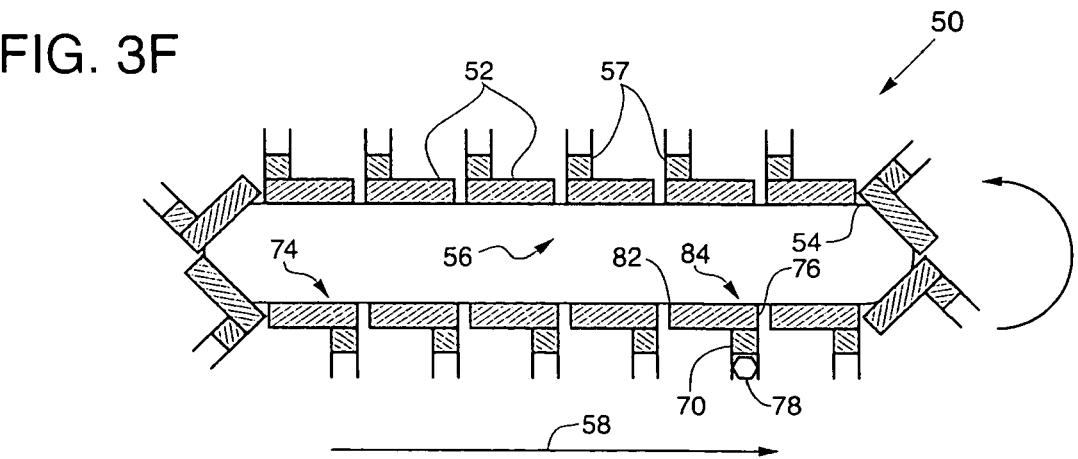
Figure 3G:
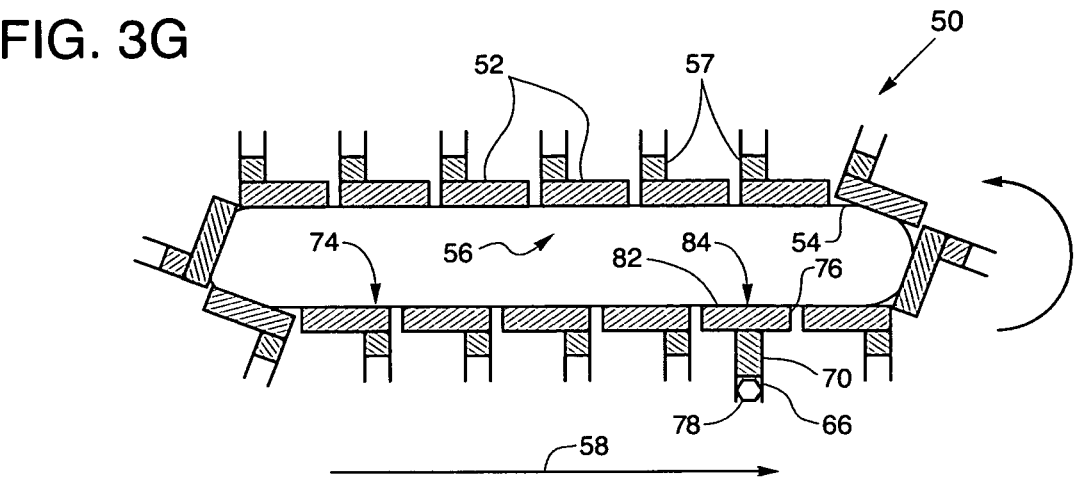
Figure 3H:
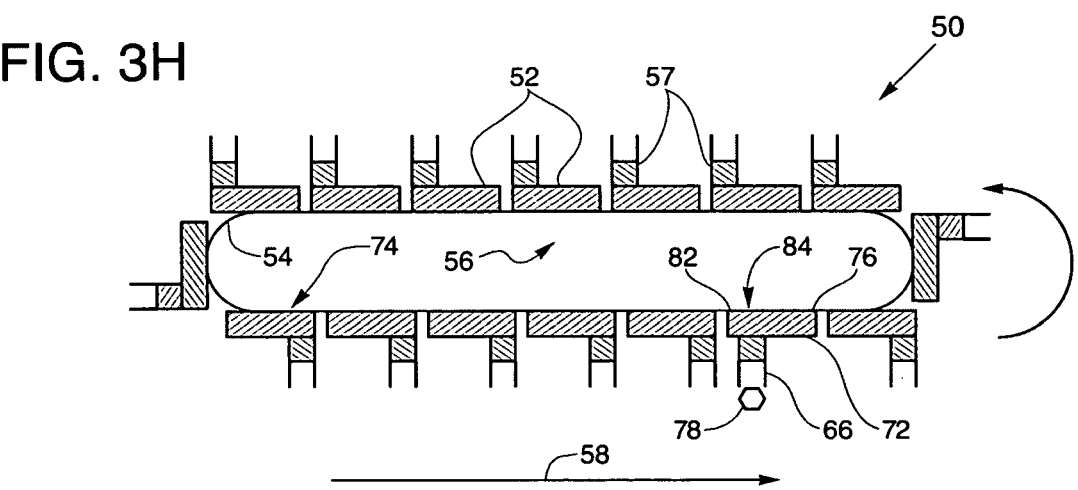
Figure 3I:
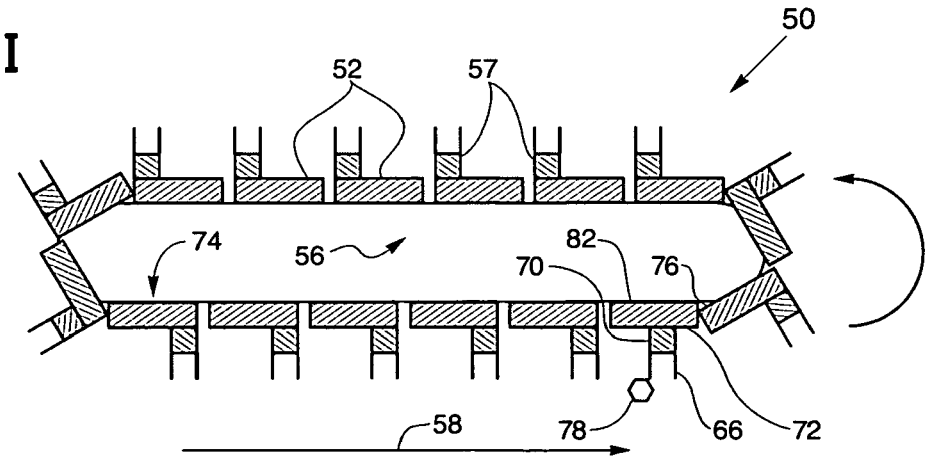
Figure 3J:
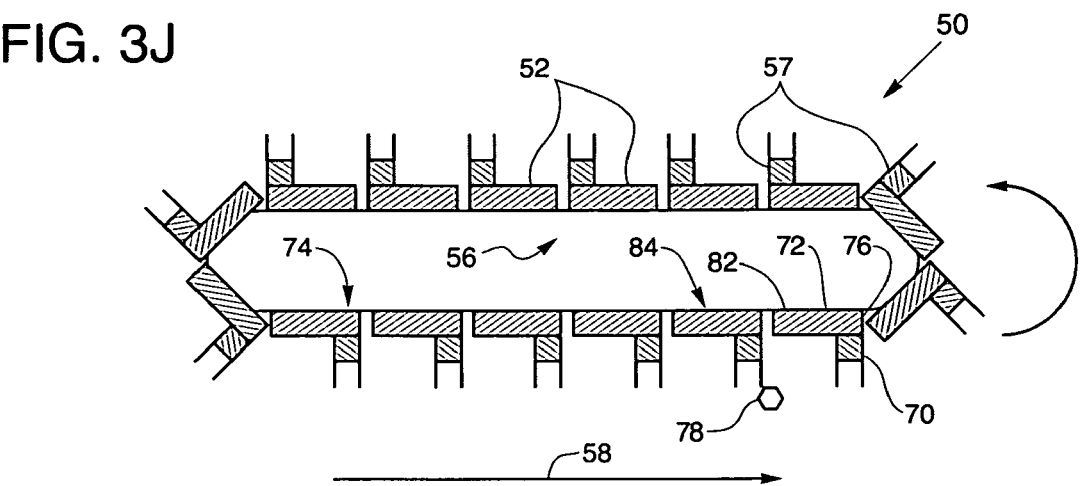

FIGS. 3F-3H show that the tread 72 has been moved by the tread drive means, such as the tread loop chain or belt 54, from the first object work-position 74 (shown in FIG. 3A) to a second object work-position 84 (shown in FIGS. 3F-3H). When the tread 72 is adjacent the second object work-position 84, the head 70 is in the head-start position 76, and the controller again controls the head securing means to move the head in a direction opposed to the work-axis 58 direction of travel of the tread 72 from the head-start position 76 to the head-grab position 82 to achieve a net-zero motion relative to the second object work-position 76 so that the work object 78 may be precisely placed at the second object work-position 84. Then or simultaneously, the controller controls the head 70 to have its material handling device 66 place the object 78 at the second object work-position 84 (e.g., upon a packaging conveyor (not shown), etc.) as shown in FIG. 3H. Next, as shown in FIGS. 3I and 3J, the head securing means moves the head 70 back from the head-grab position 82 to the head start position 76 as the tread 72 is moved along the tread loop 56. This positions the head 70 in the head-start position 76 as the head 70 again reaches the first object work-position 74 and the tread 72 and the net-zero motion head 70 repeat the movement of an object described above.

Figure 4:
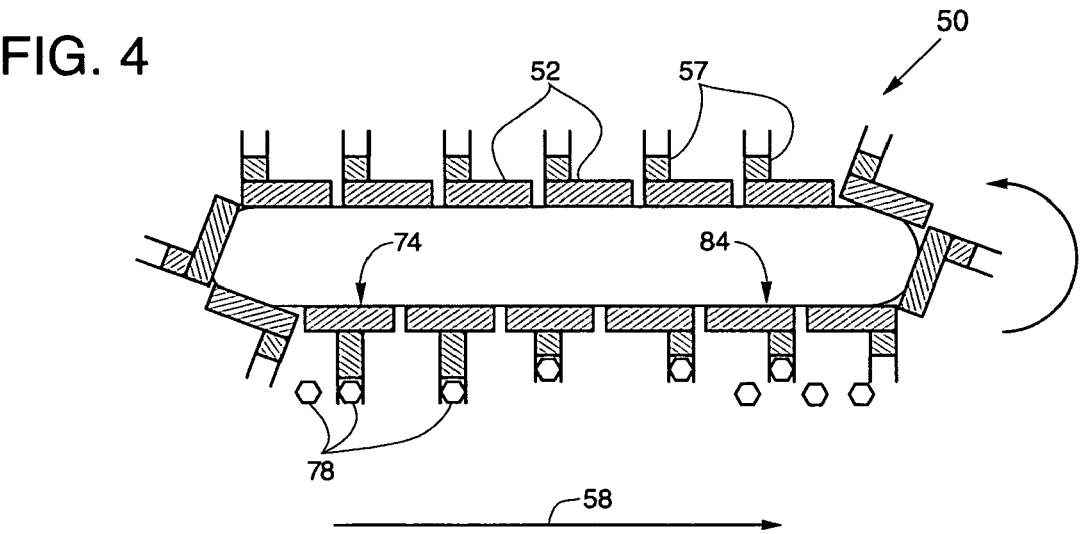
FIG. 4 is a simplified schematic view of the FIGS. 3A-J robotic tread system showing a plurality of heads simultaneously grabbing, moving and placing a plurality of objects.

FIG. 4 shows that the tread loop 56 embodiment of the robotic tread system 50 may be controlled to move a plurality of work objects 78 simultaneously from the first object work-position 74 to the second object work-position 84. In such a work embodiment, the movement of the heads 57, 70 described above would be repeated to achieve a net-zero motion relative to the object to be grabbed and relative to the first and second object work-positions 74, 84 as the objects 78 are picked from the first object work position 74 and then placed in the second object work-position 84.

Figure 5:
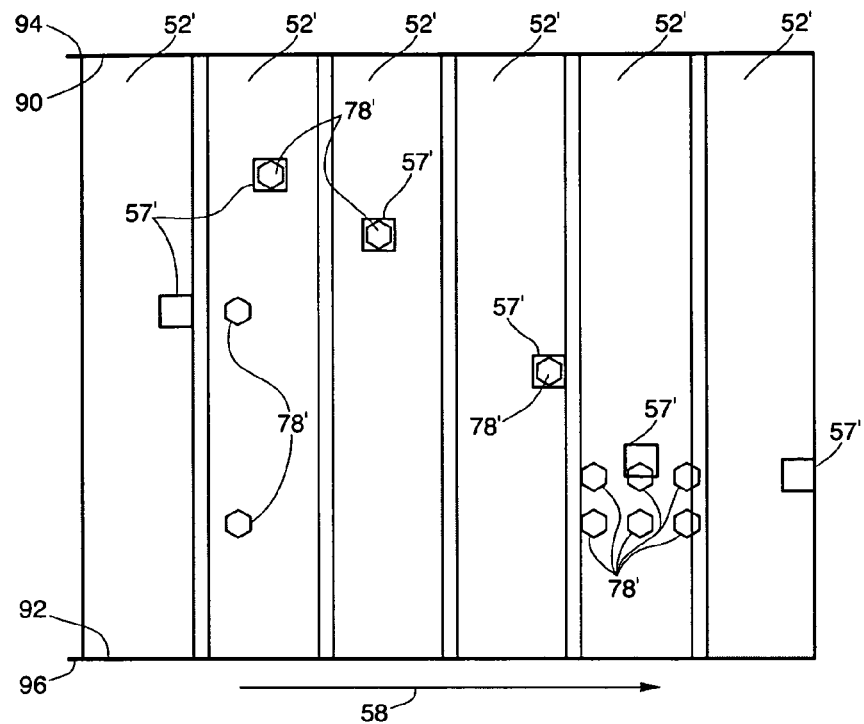
FIG. 5 is a simplified schematic top view of a plurality of treads of the present invention showing varying positions of heads secured to the treads.

FIG. 5 shows a simplified, schematic top view of a plurality of treads 52' of the present invention, and shows that the treads 52' may have adequate length and depth to support the heads 57' in a variety of locations along the treads 52'. Such treads 52' may be supported at opposed side edges of the treads 90, 92 by two chains 94, 96 of the tread loop drive means so that the chains 94, 96 drive the treads 52' in a direction parallel to and in the same direction as the tread work-axis 58. FIG. 5 also shows that the treads 52' may have their heads 57' positioned along the treads 52' at varying locations in order to pick-and-place a variety of work objects 78' dispersed in varying locations adjacent the treads 52'. The head securing means would be configured to move each head 57' along each such tread 52' both parallel to and perpendicular to the tread work-axis 58 direction of travel.

Figure 6:
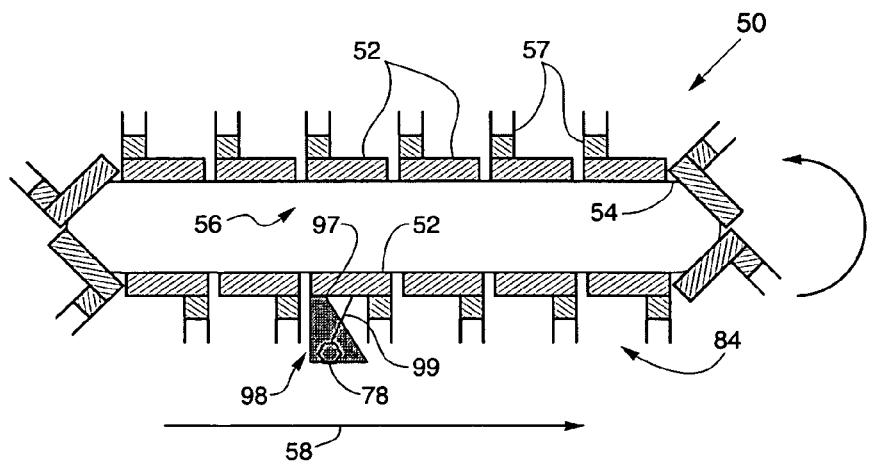
FIG. 6 is a simplified schematic view of a robotic tread system of the present invention showing a plurality of treads secured in a tread loop and showing a schematic representation of a vision system means secured to a tread.
Figure 7:
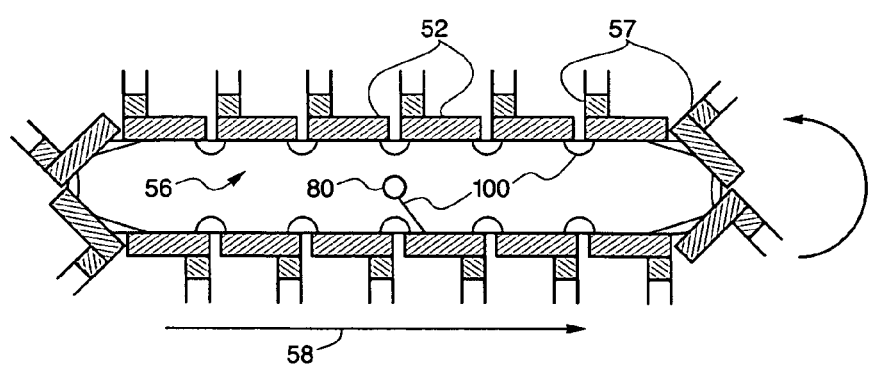
FIG. 7 is a simplified schematic view of a robotic tread system of the present invention showing a controller means secured by a communication line to at least one tread of a tread loop, and showing communication lines secured between the treads of the tread loop.

FIG. 6 shows a simplified schematic view of the tread loop 56 embodiment of the system 50 wherein a vision system means 98 is secured to a tread 52 for sensing a location of the object 78, communicating the sensed position to the head 52, or to the controller means 80 (shown in FIG. 7). The controller means 80 may utilize a communication line 100 secured between the vision system means 98 and the controller 80, and/or between the other treads 52 and/or heads 57 of the tread loop 56, or the controller means may alternatively or in part utilize any wireless or comparable mechanisms or apparatus known in the art to communicate between the vision system means 98 and the controller and/or between the other treads 52 and/or heads 57, to communicate the sensed information on the position of the object 78 to the loop drive means 54 to commence the above described sequence of movements of the exemplary work head 70 to acquire, move and place the object 78. The vision system means may also be utilized to sense the location of the first and/or second object work-positions 74, 84. The vision system means may consist of any machine or apparatus known in the art that can perform the described functions, including for example a laser-generated angled line 99 that would be observed by a vision camera 97 as the angled line contacts the object 78 to thereby sense the contact and communicate the sensed contact to the controller. Additionally, the vision means may also or alternatively include apparatus capable of detecting and responding to reflected light, capable of transmitting light and detecting and responding to reflected lights, capable of detecting and/or transmitting radio frequency waves, etc. Similarly, and as shown in FIG. 7, the controller means 80 may be any apparatus known in the art capable of performing control functions described herein, including a computer with sensing and control communication lines and/or transmission-reception capabilities, electro-mechanical switches possibly using solenoids, human-operator initiated switching and or operator triggering of mechanical controls, etc.

Figure 8A:
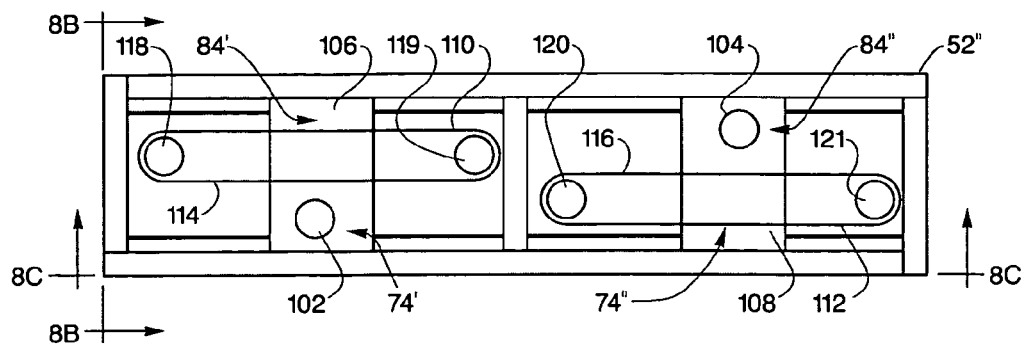
FIG. 8A shows a simplified, schematic top view of a tread showing schematically two exemplary head securing means for moving a first head in a first back-and-forth direction upon the tread, and for moving a second head in a second back-and-fort direction.
Figure 8B:
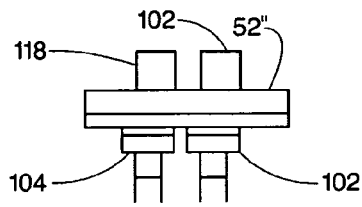
FIG. 8B shows a side view of the FIG. 8A tread taken along sight lines 8B-8B of FIG. 8A.
Figure 8C:
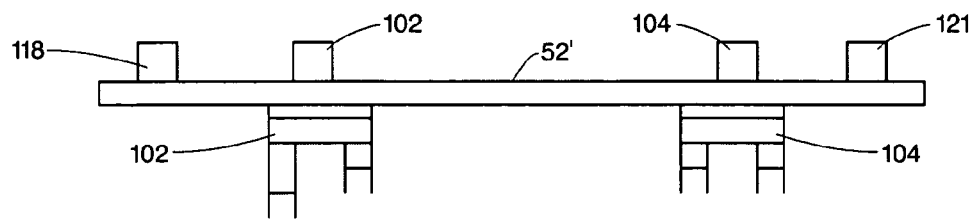
FIG. 8C shows a front view of the FIG. 8A tread taken along sight lines 8C of FIG. 8A.

FIGS. 8A, 8B and 8C shows simplified, schematic top, side and front views of a tread 52" having a first head 102 and a second head 104, and showing an exemplary embodiment of head securing means having functions described above. The first and second heads 102, 104 may be secured respectively to first and second plates 106, 108 that are adjustably secured to the tread 52". The plates 106, 108 may be secured to first and second plate moving means 110, 112 for moving the plates 106, 108 in a first back-and-forth direction between head-start positions 74', 74" to head-grab positions 84', 84", as shown in FIG. 8, top view. The tread 52" may also include third and fourth plate moving means (not shown) within the plates 106, 108 for moving the head along the plates 106, 108 in a second back-and-forth direction that is opposed to the first back-and-forth direction. The first, second, third and fourth plate moving means may be powered pulleys 118, 120 having looped lines 114, 116 secured to the plates 106, 108 and pulleys 118, 120, or threaded screws (not shown) secured to the plates 106, 108 and or the heads 102, 104 and control motors (not shown) therefor, etc. The first, second, third and fourth plate moving means may also be in communication with the controller means 80 for controlling timing and sequencing of movement of the heads 100, 104.

Figure 9:
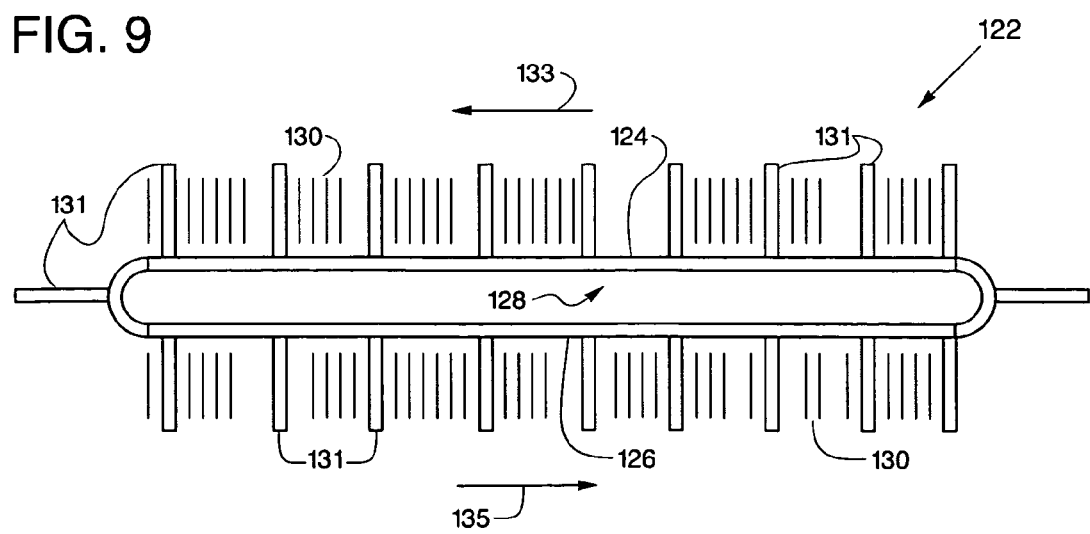
FIG. 9 shows a simplified schematic view of a robotic tread system of the present invention deployed so that opposed sides of a tread loop are about the same distance from a floor supporting the tread loop to facilitate simultaneous movement of objects by the opposed sides in opposed directions.

FIG. 9 shows a simplified schematic view of a robotic tread system 122 of the present invention deployed so that opposed sides 124, 126 of a tread loop 128 are about the same distance from a floor (not shown) supporting a tread loop 128 to facilitate simultaneous movement of objects 130 by a plurality of treads 131 having net-zero motion heads (not shown in FIG. 9) by the opposed sides 124, 126 in opposed directions. A first such direction is represented by arrow 133, and the opposed direction is represented by arrow 135 in FIG. 9. This opposed direction object movement embodiment 122 of the robotic tread system would be appropriate where for example a stack of work objects 16 or large trays of processed foods (e.g., cookies) are positioned centrally adjacent the tread loop 128, and two packaging conveyor lines (not shown) are positioned adjacent the opposed sides 124, 126 of the stack of work objects. One-half of the tread loop 128 could then deliver work objects from the tray or stack to one of the packaging conveyor lines while the opposed half of the tread loop delivers work objects from the stack to the other of the conveyor lines. The opposed direction object movement embodiment 122 of the robotic tread system may also be characterized as a non-overhead loop, wherein more common configurations of loop tread embodiments would have a return portion of the loop above (with respect to a direction of the force of gravity) a work portion of the loop, such as shown schematically with respect to the FIGS. 3A-3I embodiments.

Figure 10:
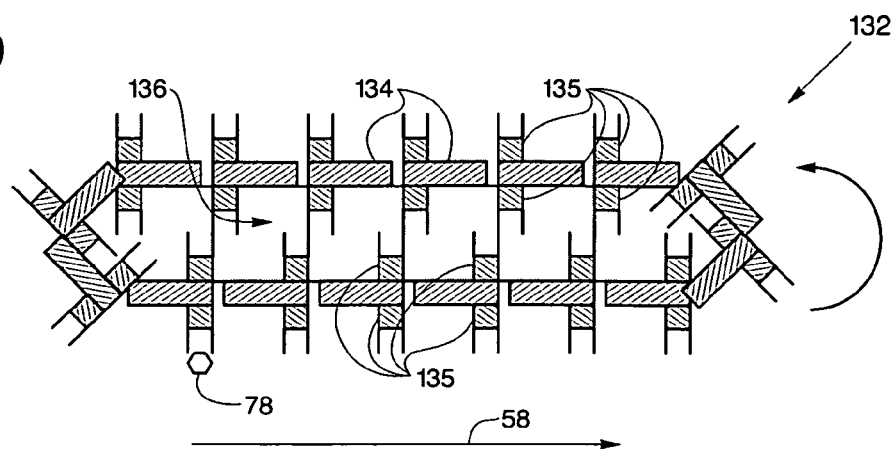
FIG. 10 is a simplified schematic view of a robotic tread system of the present invention showing each tread of a tread loop having heads secured to opposed sides of the tread to facilitate movement of greater numbers of objects by each tread.

FIG. 10 shows a further alternative embodiment of the present disclosure, including a double-head robotic tread system 132. In the double-head system 132, each tread 134 of a tread loop 136 has heads 135 secured to opposed sides of the tread 134 to facilitate movement of greater numbers of objects 78 by each tread 134. At least one and preferably all of the heads 135 are net-zero movement heads, as described above.

Figure 11:
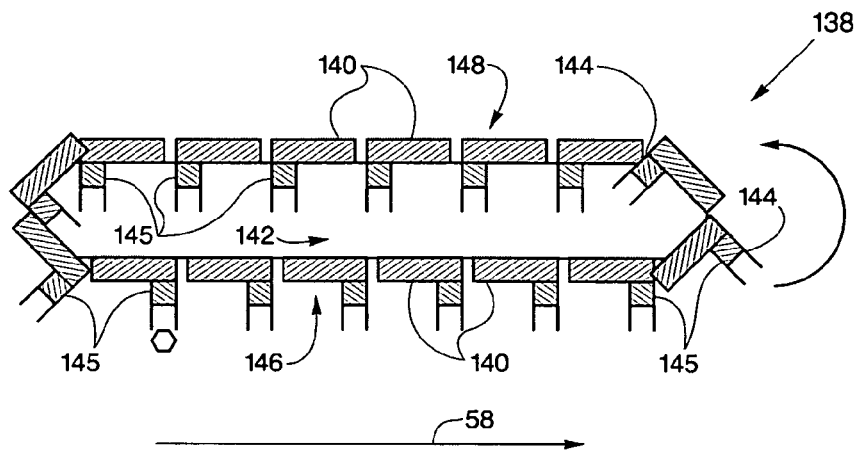
FIG. 11 is a simplified schematic view of a robotic tread system of the present invention showing a plurality of treads secured to a loop means to form a tread loop and showing at least one tread rotating about one-hundred eighty degrees to position a head secured to the tread in an opposed facing position on opposed sides of the loop so that on one side of the loop the head projects from the tread away from the center of the loop and on the opposed side of the loop the head projects toward the center of the loop.

FIG. 11 shows an additional embodiment of the present robotic tread system identified as a twisting tread robotic tread system 138. The system 138 includes a plurality of treads 140 secured within a tread loop 142 means and showing at least one tread 144 rotating about one-hundred eighty degrees to position a head 145 secured to the tread 140 in an opposed facing position on opposed sides of the loop 142 so that on a first side 146 of the loop 142 the head projects from the tread 140 away from a center of the loop and on an opposed second side 148 of the loop 142 the head projects toward the center of the loop. At least one and preferably all of the heads 145 are net-zero movement heads, as described above.

The tread loop 56 embodiment of the robotic tread system 50 may also include the treads connected by an umbilical cord or line 100 from a central rotary union or controller 80 to a single tread 52 or head 57 by way of a flexible cable and hose 100. Such an umbilical cord 100 or similar communication conduit could transfer power, information and/or compressed air. The overall communication control could also be achieved by wireless Ethernet or similar transmitted communication signals from the controller 80 to either an exemplary, lead tread 72 or head 70. Such and exemplary or lead head 70 could then transfer sensed information, power and/or compressed air to other heads 57 in the tread loop 56 by a chain or sequence of lines 100 between treads 52.

The components of the various disclosed and illustrated embodiments of the robotic tread systems 50, 51, 122, 132, 138 having net-zero motion heads 64, 57, 70, 102, 104, 135, 145 may be manufactured out of materials known in the art of automated "pick-and-place" machinery and related apparatus, such as disclosed in the above referenced U.S. Pat. No. 6,688,451.

While the disclosure has been described with reference to illustrated and exemplary embodiments of the robotic tread systems 50, 51, 122, 132, 138 having net-zero motion heads 64, 57, 70, 102, 104, 135, 145 it will be understood by those skilled in the art that various changes may be made and equivalents may be substituted for elements thereof without departing from the scope of the disclosure. In addition, many modifications may be made to adapt a particular situation or material to the teachings without departing from the essential scope thereof. For example, the disclosure includes having a tread loop 56 wherein only a certain number of treads 52 have heads 57, such as every other tread 52, or every fifth tread 52, etc., in order to gain distance between pick-and-place locations with minimal hardware costs. Such an embodiment may be referred to herein as wherein at least one of the plurality of treads 52 includes a net-zero motion head 57. Also, whenever a motion of any head 57, 65 or tread 52, 52' is described herein such as being "parallel to" or "perpendicular to", it is to be understood that such relative motion is to include motion within plus or minus 15 percent of the "tread work-axis 58 of motion" or any other referenced direction. Therefore, it is intended that the disclosure not be limited to the particular embodiments disclosed. Accordingly, reference should be made primarily to the following claims rather than the foregoing description to determine the scope of the invention.

What is claimed is:

1. A robotic tread system (50) for moving an object (78), the system comprising:
   a. at least one tread (52) secured to a tread drive means (54) for moving the tread (52) in a direction parallel to and in the same direction as a tread work-axis of motion (58) relative to the object (78);
   b. at least one head (57) adjustably secured to the tread (52), the head (57) including at least one material handling device (66) for grabbing and manipulating the object (78), the head (57) adjustably secured to the tread (52) by head securing means for selectively moving the head in at least a direction opposed to the tread work-axis of motion (58) and for selectively moving the head (57) at a rate of speed at least the same as a rate of speed the tread drive means (54) moves the tread (52) parallel to the work-axis of motion (58), and the head (57) configured so that as the tread (52) moves in the same direction as the work-axis of motion (58) relative to the object (78), the head (57) moves along the tread (52) in an opposed direction resulting in the head (57) having a net-zero motion relative to the object to thereby facilitate the material handling device (66) of the head (57) grabbing the object (78).

2. The tread system (50) of claim 1, wherein the head securing means also selectively moves the head (57) in the same direction as the tread work-axis of motion (58).

3. The tread system (50) of claim 2, wherein the head securing means also selectively moves the head (57) in a direction perpendicular to the direction of the tread work-axis of motion (58).

4. The tread system (50) of claim 1, further comprising a plurality of treads (52) secured to a loop support and drive means (54) for securing the treads (52) together in the form of a tread loop (56) and for driving the treads (52) in an endless tread loop (56) so that each tread (52) passes adjacent at least a first object work-position (74) and adjacent a second object-work position (84), and wherein at least one of the plurality of treads (52) includes a head (57).

5. The tread system (50) of claim 1, wherein at least one of the plurality of treads (52) includes a plurality of heads (57) adjustably secured to the tread (52), each of the plurality of heads (57) having a material handling device (66), and each of the plurality of heads (57) adjustably secured to the tread (52) by head securing means for selectively moving the head in at least a direction opposed to the tread work-axis of motion (58) and for selectively moving the head (57) at a rate of speed at least the same as a rate of speed the tread drive means (54) moves the tread (52) parallel to the work-axis of motion (58).

6. The tread system (50) of claim 4, further comprising a vision system means (98) secured to a tread loop (56) for sensing a location of the object (78).

7. The tread system (50) of claim 1, wherein the head securing means includes one or more plates (106, 108) having one or more heads (102, 104) secured thereto, and wherein the plates (106, 108) are adjustably secured to the tread (52') by plate moving means (110, 112) for moving the plates in back-and-forth directions between head-start positions (74', 74") to head-grab positions (84', 84").

8. The tread system (50) of claim 4, further comprising a double-head robotic tread system (132), wherein at least one of the treads (134) of the tread loop (136) has heads (135) secured to opposed sides of the tread (134) to facilitate movement of greater numbers of objects (78) by each tread (134), and wherein each head (135) is secured to the tread (134) by head securing means for selectively moving the head (135) in at least a direction opposed to the tread work-axis of motion (58) and for selectively moving the head (135) at a rate of speed at least the same as a rate of speed the tread drive means (54) moves the tread (134) parallel to the work-axis of motion (58).

9. The tread system (50) of claim 4, further comprising a twisting tread robotic tread system (138), wherein at least one of the treads (144) of the tread loop (142) is configured to rotate about one-hundred and eighty degrees to position a head (145) secured to the tread (144) in an opposed facing position on opposed sides of the loop (142) so that on a first side (146) of the loop (142) the head projects from the tread (140) away from a center of the loop (142) and on an opposed second side (148) of the loop (142) the head (145) projects toward the center of the loop (142), and wherein the head (145) is secured to the tread (144) by head securing means for selectively moving the head (145) in at least a direction opposed to the tread work-axis of motion (58) and for selectively moving the head (145) at a rate of speed at least the same as a rate of speed the tread drive means (54) moves the tread (144) parallel to the work-axis of motion (58).

10. The tread system (50) of claim 1, wherein the head (57) includes a plurality of material handling devices (66).

11. A method of moving an object (78) from a first object work-position (74) to a second object work-position (84) comprising:
   a. passing a tread (52) adjacent the object (78) while the tread (52) travels in a tread work-axis of motion (58) direction between the first object work-position (74) and the second object work-position (84);
   b. moving a head (57) secured to the tread (52) in a direction opposed to the tread work-axis of motion (58) direction at a rate of speed about the same as a rate of speed of the tread (52) so that the head (57) achieves a net-zero motion relative to the object (78), while positioning the head (57) adjacent the object (78);
   c. then grabbing the object (78) with a material handling device (66) secured to the head (57) while the head (57) is at a net-zero motion relative to the object (78); and,
   d. then passing the tread (52) adjacent the second object work-position (84) while releasing the object (78) from the material handling device (66) on to the second object-work position (84).

12. The method of claim 11, comprising the further steps of, after the step of grabbing the object (78) and before the step of passing the tread (52) adjacent the second object work-position (84), moving the head (57) from a head-grab position (82) to a head-start position (76) by moving the head (57) in the direction of the tread work-axis (58) before the tread (52) passes adjacent the second object-work position (84); then moving the head (57) secured to the tread (52) in a direction opposed to the tread work-axis of motion (58) direction at a rate of speed about the same as a rate of speed of the tread (52) so that the head (57) achieves a net-zero motion relative to the second object work-position (84) while releasing the object (78) from the material handling device (66) on to the second object-work position (84).

13. The method of claim 12, comprising the further steps of, after the step of releasing the object (78) step, returning the head (57) back to the head-start position (76) by moving the head (57) secured to the tread (52) in a direction opposed to the tread work-axis of motion (58); and, cycling the tread (52) through a tread loop (56) so that the tread (52) again passes adjacent the first object-work position (74).

* * * * *